A. L. BURKE.
ADJUSTABLE HORSE COLLAR.
APPLICATION FILED SEPT. 7, 1909.
960,810.
Patented June 7, 1910.
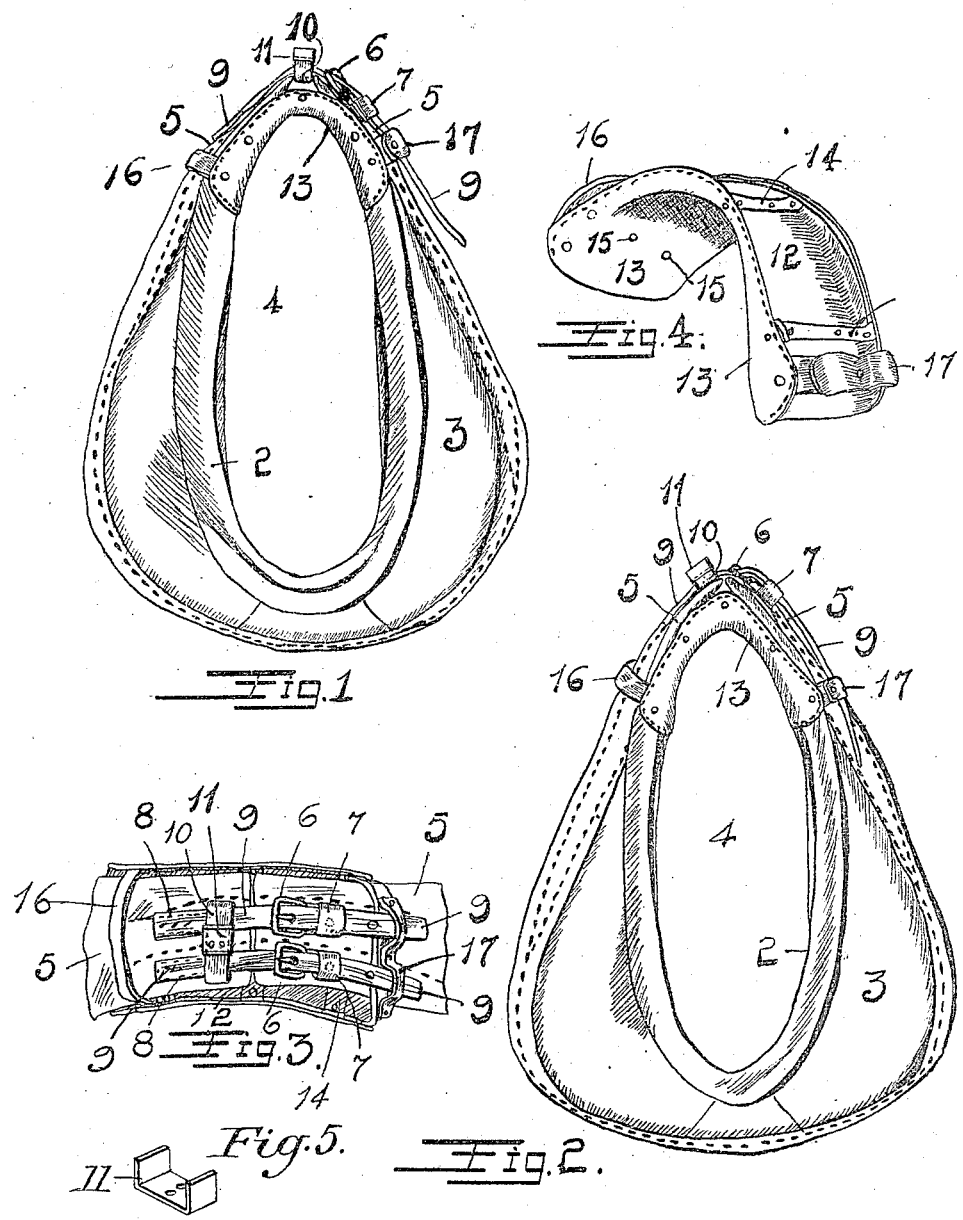

UNITED STATES PATENT OFFICE.

ANSLEM L. BURKE, OF GALESBURG, ILLINOIS, ASSIGNOR TO ADAMS & JOHNSON CO., A CORPORATION OF ILLINOIS.

ADJUSTABLE HORSE-COLLAR.

960,810.  Specification of Letters Patent.  Patented June 7, 1910.

Application filed September 7, 1909. Serial No. 516,423.

*To all whom it may concern:*

Be it known that I, ANSLEM L. BURKE, a citizen of the United States, and a resident of Galesburg, in the county of Knox and State of Illinois, have invented a new and useful Adjustable Horse-Collar, of which the following is a specification.

My invention relates to adjustable horse-collars.

As collars for horses, mules and other draft animals are now ordinarily made, they range or vary in what is known as "stock sizes" from 17 to 22 inches, larger or smaller sizes being known to the trade as "specials". To be able to accommodate his trade a dealer is obliged to carry in stock collars of each of the stock sizes, and to a small dealer this is frequently burdensome. Also, it is frequently the case that an owner will often exchange his animals—smaller for larger ones, or vice versa. It is inconvenient and expensive for him to purchase each of the six stock sizes.

To provide a spreader-loop which is slidable on the billets in order to increase the efficiency and usefulness of the collar, whereby the ends thereof may be brought into juxtaposition and the pad centralized with reference to the neck of the animal and to the ends of the collar, and to thereby furnish a more perfectly fitting and neater appearing collar, constitutes the primary object of my invention.

To provide a collar so constructed that it is readily adjustable to fit the necks of animals varying to quite an extent in size, and which collar, especially at the upper or bearing portion thereof will at once, upon being fitted to the animal, assume the shape of the neck, constitutes a further object of the invention.

To provide a collar combining simplicity with strength constitutes a still further object of the invention.

The invention accordingly consists in the features of construction, combinations of parts, and selective arrangements and disposition of parts for co-action, the scope of which will be pointed out in the appended claim.

A collar embodying the structural peculiarities, and showing the combination, mutual relationship and selective arrangement of the parts thereof, is shown in the accompanying drawings, in which:

Figure 1 is a front elevation, showing a collar adjusted to its central position; Fig. 2, a similar view, showing the collar adjusted to its smallest position; Fig. 3, an enlarged fragmental detail, a plan of the collar adjusted to the position shown at Fig. 2; Fig. 4, an enlarged perspective of the pad forming a part of my improvements; and Fig. 5, a perspective of the hame-strap guide, enlarged.

Referring now to the drawings by numerals, the same one indicating the same part in the different figures thereof, 2 represents the rim or roll and 3 the "back" or padded shoulder portion of my improved collar 4. Instead of drawing the end portions 5 of the collar inwardly, or curving them, as has heretofore been done, I so construct them that each is approximately straight—in other words, they converge toward each other toward their extremities rather than curve so that their ends abut when in normal or loose position. One of the end portions is equipped with ordinary buckles 6 and keepers 7, the buckles being set back a short distance from the end of the collar. Fixed, preferably by stitches 8, on the other end are billets 9, adapted for engagement with said buckles and loops. The stitching 8 does not extend entirely to the extremity of the portion 5, in order that a slidable spreader loop 10 preferably riveted together at its central portion to provide a separate loop for each billet 9, may stride said billets and rest on said portion 5 when the collar is in its smallest adjustment, as shown at Figs. 2 and 3. The function of the spreader loop will be more fully hereinafter described. A hame strap guide or centering device 11, preferably a U-shaped or channeled casting, is suitably secured to the spreader loop. It will be manifest that the hame strap may be instantly placed therein or removed therefrom without unbuckling any straps or without running it through a loop. If preferred, the same rivets which divide the spreader loop into a double one may be used to secure the hame-strap guide thereto.

The pad shown comprises what I may term a base 12 constructed preferably of an inverted U-shaped plate of zinc or other non-resilient metal, which base is fixed to and surmounts a somewhat larger leather contact piece 13. Reinforce strips 14 of leather extend transversely of the plate 12, and rivets 15 secure the parts 12, 13 and 14 together. The ends of the reinforce strips 14 are elongated, and after the longitudinal edges of the contact piece 13 have been flared upwardly—to effectually prevent chafing or galling—they are riveted to said flared edges, whereby the latter are securely held from falling, even under the most unfavorable conditions. A securing strap or loop 16 is fixed to one end of the contact piece, and a similar strap 17 is fixed to its other end, the strap 17 being provided with a double keeper for the ends of the billets.

I may now state that I prefer to make two sizes of stock collars—one to include 17, 18 and 19 inches, and the other to include 20, 21 and 22 inches. As shown at Fig. 3, each billet is provided with three apertures, spaced one inch apart. These matters, it will be evident, are optional.

Supposing it to be desirable to fit an animal having a 21 inch neck with a collar, and the one illustrated in the drawings to include that size. The operator after having placed the collar in the usual manner will engage the buckles with the central holes in the billets (which may be die stamped with the size if preferred,) and will place the spreader loop in the position shown at Fig. 1. Should he then desire to fit the same collar to an animal having a 20 inch neck, he will, after having positioned it, engage the buckles with the last aperture, as shown at Fig. 2, placing the spreader loop in the position there shown. It will be evident that the straps 16 and 17 will permit the pad to freely slide to automatically adjust itself to place, and that the force exerted by the act of drawing the billets into engagement with the buckles will also slightly contract the zinc and thereby the contact piece of the pad, and the zinc being non-resilient will retain its shape and size. Should it be desirable to fit the collar to an animal having a 22 inch neck, the last holes will be utilized, the operator having previously drawn or spread the ends of the pad apart and having placed the spreader in central position.

The feature of the slidable spreader loop being movable with reference to the billets, the collar-ends and the pad, is more than a formal structural one—it is functional and adds greatly to the perfect fulfilment of the purposes and objects of the invention. Its importance lies mainly in that when the buckles are engaged with either of the billet-apertures and the collar *per se* somewhat loose, said loop may be slid to any preferred position thereon, but always equidistant from both ends of the collar. If it were not slidable, but was secured or fixed to the pad, then when adjustments of the billets and buckles were made the pad would not be centralized with reference to the animal's neck and the collar ends, and the result would be an inefficient collar. Again, and equally important, with the loop slidable to the position shown at Figs. 2 and 3 and the buckles set back as shown, the collar ends may be brought into juxtaposition, or to abut, as shown at said figures, whereby not only a more perfectly fitting and neater appearing collar is provided, but a greater adjustment of approximately two inches is permitted, the same length billet being used.

Having thus set forth the preferred construction, and having recited the purposes, advantages and operation of my invention, I claim as new and desire to claim as new the following, to-wit:

In a horse-collar having upper end portions adapted for adjustments toward or from each other, billets stitched to and on the surface of one of said end portions but free therefrom for a slight distance from the extremity thereof, buckles fixed to and on the surface of the other end portion of said collar a slight distance from the extremity thereof, said buckles adapted for selective engagements with said billets, and a spreader loop loosely mounted on said billets and adapted to rest in one position in rear of the billet end of the collar proper, whereby it is removed from between said end portions and whereby they are permitted to abut.

In witness whereof, I hereunto sign my name this 7th day of August, 1909, in presence of two witnesses.

ANSLEM L. BURKE.

Witnesses:
A. S. HAMILTON,
H. M. RICHARDS.